United States Patent
Chang

(10) Patent No.: US 7,534,004 B2
(45) Date of Patent: May 19, 2009

(54) BACKLIGHT MODULE HAVING LIGHT REFLECTING AND CONVERGING STRUCTURE

(75) Inventor: Hsien-Wen Chang, Miao-Li (TW)

(73) Assignee: Innolux Display Corp., Miao-Li County (TW)

( * ) Notice: Subject to any disclaimer, the term of this patent is extended or adjusted under 35 U.S.C. 154(b) by 125 days.

(21) Appl. No.: 11/644,590

(22) Filed: Dec. 21, 2006

(65) Prior Publication Data

US 2007/0147093 A1   Jun. 28, 2007

(30) Foreign Application Priority Data

Dec. 23, 2005   (TW) .............................. 94146261 A

(51) Int. Cl.
G09F 13/04 (2006.01)
F21V 7/04 (2006.01)
G02F 1/13357 (2006.01)

(52) U.S. Cl. ............................. 362/97; 362/29; 362/30; 362/632; 362/633; 362/634

(58) Field of Classification Search ............ 362/29, 362/30, 632–634, 97
See application file for complete search history.

(56) References Cited

U.S. PATENT DOCUMENTS

| | | | |
|---|---|---|---|
| 5,613,751 A * | 3/1997 | Parker et al. | 362/627 |
| 6,960,002 B2 | 11/2005 | Tsai | |
| 7,259,810 B2 * | 8/2007 | Kim | 349/67 |
| 7,317,182 B2 * | 1/2008 | Schultz et al. | 250/227.31 |
| 2005/0168968 A1 * | 8/2005 | Lin et al. | 362/29 |

* cited by examiner

*Primary Examiner*—Sandra L O'Shea
*Assistant Examiner*—James W Cranson
(74) *Attorney, Agent, or Firm*—Wei Te Chung

(57) ABSTRACT

An exemplary backlight module (300) includes a light source (320), a frame (310) and diffusing plate (340). The frame includes an inner bottom surface (314) and an inner side surface (312) adjacent to the bottom surface. The side surface includes a light reflecting and converging structure. The diffusing plate cooperates with the frame to define a space that accommodates the light source. The side surfaces having the v-shape structures can reflect and converge light beams toward the middle portion of the diffusing plate, thus preventing these light beams from otherwise obliquely entering peripheries of the diffusing plate and subsequently being lost. Therefore, the backlight module has an increased light utilization ratio.

20 Claims, 2 Drawing Sheets

BACKLIGHT MODULE HAVING LIGHT REFLECTING AND CONVERGING STRUCTURE

BACKGROUND

1. Field of the Invention

The present invention relates to backlight modules, and particularly to a backlight module having a light reflecting and converging structure.

2. General Background

A liquid crystal display is capable of displaying a clear and sharp image through thousands or even millions of pixels that make up the complete image. The liquid crystal display has thus been applied to various electronic equipment in which messages or pictures need to be displayed, such as mobile phones and notebook computers. However, liquid crystal in the liquid crystal display does not itself emit light. Rather, the liquid crystal has to be lit up by a light source so as to clearly and sharply display text and images. The light source may be ambient light, or a backlight module attached to the liquid crystal display.

Referring to FIG. 5, a typical direct-type backlight module is shown. The backlight module 200 includes a frame 210, a linear light source 220, a reflective plate 230, and a diffusing plate 240. The frame 210 is substantially a rectangular box having a top opening (not labeled). The diffusing plate 240 is disposed corresponding to the opening of the frame 210, thereby forming a space for accommodating the reflective plate 230 and the light source 220. The frame 210 includes an inner bottom surface 214, and four inner side surfaces 212 substantially perpendicularly connected with the bottom surface 214. The light source 220 is supported by two opposite side surfaces 212, and is substantially parallel to the diffusing plate 240. The reflective plate 230 is disposed on the bottom surface 214 of the frame 210.

Some light beams emitting from the light source 220 directly reach the diffusing film 240, are diffused by the diffusing film 240, and emit out the direct-type backlight module 200. Other light beams emitting from the light source 220 reach the reflective plate 230, are reflected by the reflective plate 230, and finally emit from the diffusing plate 240.

However, some light beams emit obliquely from the light source 220, and obliquely enter peripheries of the diffusing plate 240. These light beams are liable to subsequently escape from the peripheries of the diffusing plate 240 and be lost altogether. As a result, the direct-type backlight module 200 may have a low light utilization ratio.

Therefore, a new direct-type backlight module that can overcome the above-described problems is desired.

SUMMARY

In one preferred embodiment, a backlight module includes a light source, a frame, and a diffusing plate. The frame includes an inner bottom surface and an inner side surface adjacent to the bottom surface. The side surface includes a light reflecting and converging structure. The diffusing plate cooperates with the frame to define a space that accommodates the light source.

Other advantages and novel features will become more apparent from the following detailed description when taken in conjunction with the accompanying drawings. In the drawings, all the views are schematic.

DETAILED DESCRIPTION OF PREFERRED EMBODIMENTS

Figure 1:
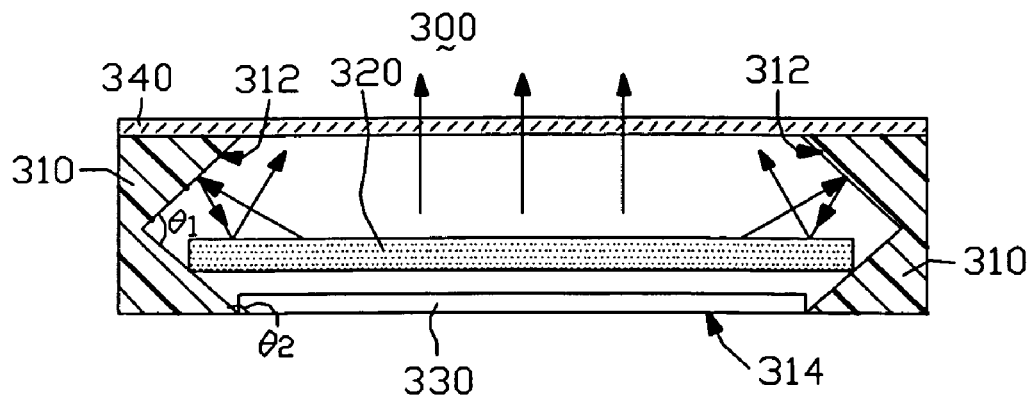
FIG. 1 is a side, cross-sectional view of a direct-type backlight module according to a first embodiment of the present invention.

Referring to FIG. 1, a direct-type backlight module 300 according to a first embodiment of the present invention is shown. The direct-type backlight module 300 includes a frame 310, a linear light source 320, a reflective plate 330, and a diffusing plate 340. The frame 310 is substantially a rectangular box having a top opening (not labeled), and can be made from plastic. The diffusing plate 340 is disposed corresponding to the opening of the frame 310, thereby forming a space for accommodating the reflective plate 330 and the light source 320. The frame 310 includes an inner bottom surface 314, and four inner side surfaces 312 substantially perpendicularly connected with the bottom surface 314. The light source 320 includes a plurality of cold cathode fluorescent lamps (CCFLs). The CCFLs are supported in parallel by two opposite side surfaces 312, and are substantially parallel to the diffusing plate 340. The reflective plate 330 is disposed on the bottom surface 314 of the frame 310. The reflective plate 330 can be made from metal having a high reflectivity, such as aluminum or silver.

Each side surface 312 of the frame 310 includes a v-shaped structure. An internal angle $\theta_1$ of the v-shaped structure is in the range from 77~90 degrees. An obtuse angle $\theta_2$ of the side surface 312 relative to the bottom surface 314 is in the range from 123~139 degrees. The backlight module 300 further includes a reflective film coated on the side surfaces 312.

After light beams emit from the light source 320, some of the light beams directly reach the diffusing film 340, are diffused by the diffusing film 340, and emit out the direct-type backlight module 300. Other of the light beams reach the reflective plate 330, are reflected by the reflective plate 330, and finally emit from the diffusing plate 340. Still other of the light beams reach the side surfaces 312, are reflected toward a middle portion (not labeled) of the diffusing plate 340, and finally emit from the middle portion of the diffusing plate 340.

In summary, the side surfaces 312 having the v-shape structures can reflect and converge light beams toward the middle portion of the diffusing plate 340, thus preventing these light beams from otherwise obliquely entering peripheries of the diffusing plate 340 and subsequently being lost. Therefore, the direct-type backlight module 300 has an increased light utilization ratio.

Figure 2:
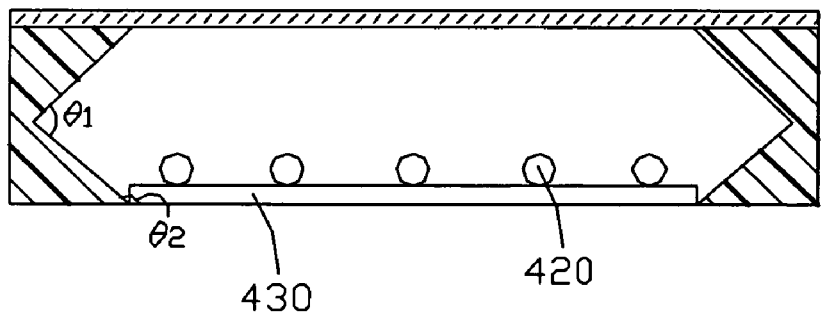
FIG. 2 is a side, cross-sectional view of a direct-type backlight module according to a second embodiment of the present invention.

Referring to FIG. 2, a direct-type backlight module 400 according to a second embodiment of the present invention is shown. The direct-type backlight module 400 is similar to the direct-type backlight module 300 of the first embodiment. However, a light source 420 of the direct-type backlight module 400 includes a plurality of light emitting diodes 420 located on a reflective plate 430. The direct-type backlight module 400 can achieve similar advantages to the direct-type backlight module 300.

Figure 3:
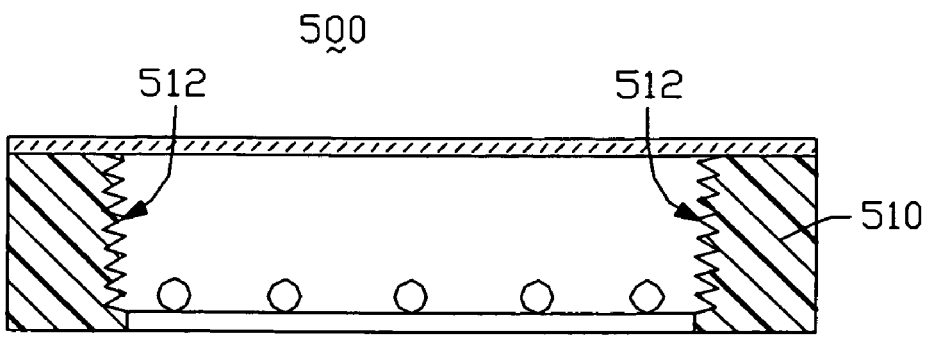
FIG. 3 is a side, cross-sectional view of a direct-type backlight module according to a third embodiment of the present invention.

Referring to FIG. 3, a direct-type backlight module 500 according to a third embodiment of the present invention is shown. The direct-type backlight module 500 is similar to the direct-type backlight module 400 of the second embodiment. However, inner side surfaces 512 of a frame 510 of the direct-type backlight module 500 each include a jagged structure. The direct-type backlight module 500 can achieve similar advantages to the direct-type backlight module 400.

Figure 4:
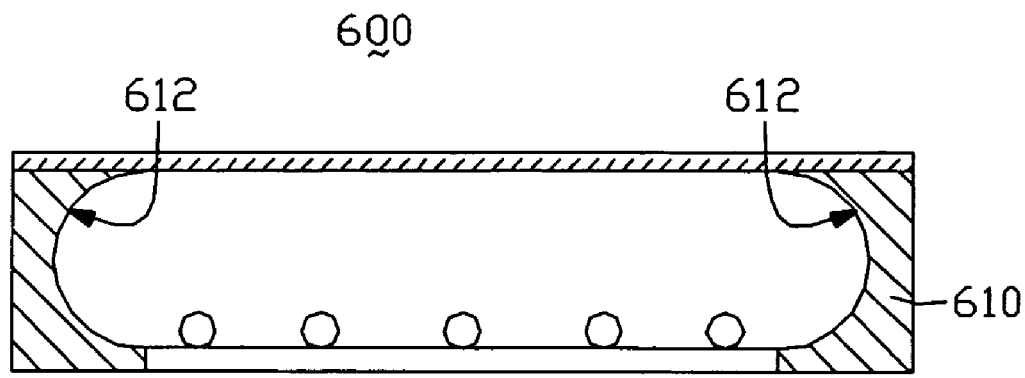
FIG. 4 is a side, cross-sectional view of a direct-type backlight module according to a fourth embodiment of the present invention.
Figure 5:
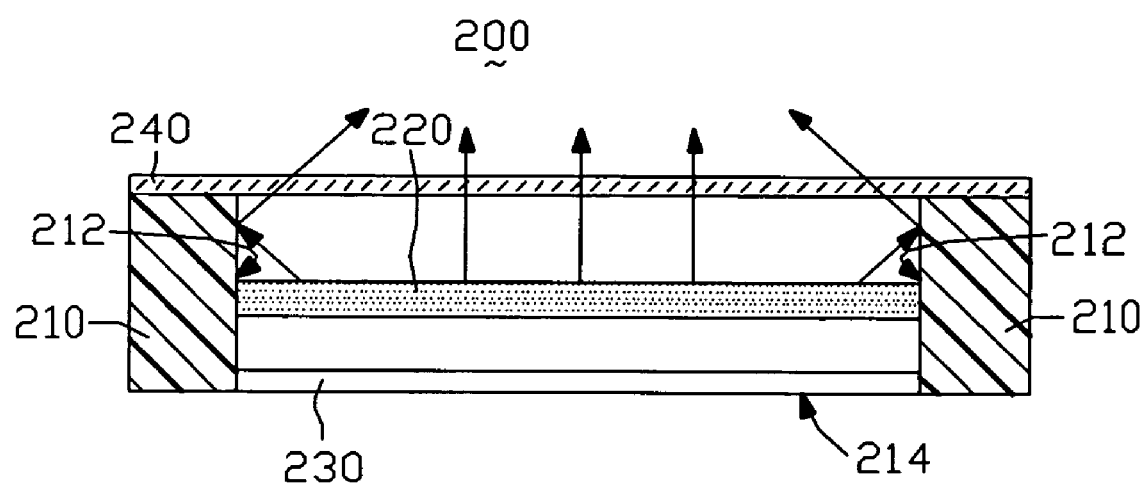
FIG. 5 is a side, cross-sectional view of a conventional direct-type backlight module.

Referring to FIG. 4, a direct-type backlight module 600 according to a fourth embodiment of the present invention is shown. The direct-type backlight module 600 is similar to the direct-type backlight module 400 of the second embodiment. However, inner side surfaces 612 of a frame 610 of the direct-type backlight module 600 each include a concave semicircular structure. The direct-type backlight module 600 can achieve similar advantages to the direct-type backlight module 400.

Further or alternative embodiments may include the following. In one example, the frame can be made from metal.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A backlight module comprising:
   a light source; and
   a frame comprising an inner bottom surface and an inner side surface adjacent to the bottom surface, the side surface comprising a light reflecting and converging structure, the light reflecting and converging structure being a v-shaped structure; and
   a diffusing plate cooperating with the frame to define a space that accommodates the light source.

2. The backlight module as claimed in claim 1, wherein an internal angle of the v-shaped structure is in the range from 77~90 degrees.

3. The backlight module as claimed in claim 1, wherein an obtuse angle of the side surface relative to the bottom surface is in the range from 123~139 degrees.

4. The backlight module as claimed in claim 1, wherein the light source comprises a plurality of cold cathode fluorescent lamps.

5. The backlight module as claimed in claim 1, wherein the light source comprises a plurality of light emitting diodes.

6. The backlight module as claimed in claim 1, wherein the frame is made from one of plastic and metal.

7. The backlight module as claimed in claim 1, further comprising a reflective plate located on the bottom surface of the frame.

8. The backlight module as claimed in claim 7, wherein the reflective plate is made from metal having a high reflectivity.

9. The backlight module as claimed in claim 8, wherein the reflective plate is made from aluminum or silver.

10. A backlight module comprising:
    a light source; and
    a frame comprising an inner bottom surface and an inner side surface adjacent to the bottom surface, the side surface comprising a light reflecting and converging structure, the light reflecting and converging structure being a jagged structure; and
    a diffusing plate cooperating with the frame to define a space that accommodates the light source.

11. The backlight module as claimed in claim 10, wherein the light source comprises a plurality of cold cathode fluorescent lamps.

12. The backlight module as claimed in claim 10, wherein the light source comprises a plurality of light emitting diodes.

13. The backlight module as claimed in claim 10, wherein the frame is made from one of plastic and metal.

14. The backlight module as claimed in claim 10, further comprising a reflective plate located on the bottom surface of the frame.

15. The backlight module as claimed in claim 14, wherein the reflective plate is made from metal having a high reflectivity.

16. The backlight module as claimed in claim 15, wherein the reflective plate is made from aluminum or silver.

17. A backlight module comprising:
    a light source; and
    a frame comprising an inner bottom surface and an inner side surface adjacent to the bottom surface, the side surface comprising a light reflecting and converging structure, the light reflecting and converging structure being a concave semicircular structure; and
    a diffusing plate cooperating with the frame to define a space that accommodates the light source.

18. The backlight module as claimed in claim 17, wherein the light source comprises a plurality of cold cathode fluorescent lamps.

19. The backlight module as claimed in claim 17, wherein the light source comprises a plurality of light emitting diodes.

20. The backlight module as claimed in claim 17, wherein the frame is made from one of plastic and metal.

* * * * *